June 18, 1963 H. R. HAGELSTEIN ETAL 3,093,911
MUSICAL TYPEWRITER
Filed Dec. 22, 1961

INVENTORS
HARRY R. HAGELSTEIN
BY EMMA A. HAGELSTEIN

Arthur H. Seidel
ATTORNEY

United States Patent Office 3,093,911
Patented June 18, 1963

3,093,911
MUSICAL TYPEWRITER
Harry R. Hagelstein and Emma A. Hagelstein, both of 100 5th Ave., New York 11, N.Y.
Filed Dec. 22, 1961, Ser. No. 161,492
2 Claims. (Cl. 35—5)

This invention relates to a musical typewriter which is educational and entertaining.

The musical typewriter of the present invention is educational in purpose since it will enable one to learn how to type. The method of learning how to type in accordance with the present invention is identical with the method taught in typing schools, namely the touch system. Any person having a knowledge of the alphabet can learn how to type with the present invention. The present invention may be utilized by blind persons having a knowledge of music since a musical note is heard each time a letter is printed on the paper in the typewriter carriage. Hence, a wrong letter will be printed on the paper each time the musical note heard is not correct. Accordingly, familiarity with the keyboard of a typewriter may be learned by anyone having familiarity with the basic musical scale.

In general, the musical typewriter of the present invention includes a typewriter structurally interrelated with a plurality of sound generating elements arranged in a sequence according to a musical scale. Each time a key of the typewriter is actuated, a musical note is heard. The letters and other indicia on the keys of the typewriter are interrelated with keys for actuating the sound generating elements to provide notes of a full scale of tones. In order to obtain a particular letter of the alphabet or other indicia imprinted on the paper in the carriage of the typewriter, a particular note must be heard. By reproducing on the paper a particular sequence of letters of the alphabet, a particular melody or tune will be heard. By reproducing a particular tune, a sentence or paragraph may be printed on the paper. Repeated use of the musical typewriter of the present invention will enable the operator to acquire skill in use of the typewriter. At the same time, the effort in acquiring the skill will be less painful and entertaining.

It is an object of the present invention to provide a novel musical typewriter.

It is another object of the present invention to provide a novel musical apparatus having tuned sound generating elements responsive to the keys of a typewriter.

It is another object of the present invention to provide a novel device for facilitating the teaching and learning of the manner of operating a typewriter.

It is another object of the present invention to provide a novel apparatus which is both educational and entertaining.

Other objects will appear hereinafter.

For the purpose of illustrating the invention there is shown in the drawings forms which are presently preferred; it being understood, however, that this invention is not limited to the precise arrangements and instrumentalities shown.

Referring to the drawing in detail, wherein like numerals indicate like elements, there is shown in FIGURE 1 a musical typewriter designated generally as 10.

Figure 1:
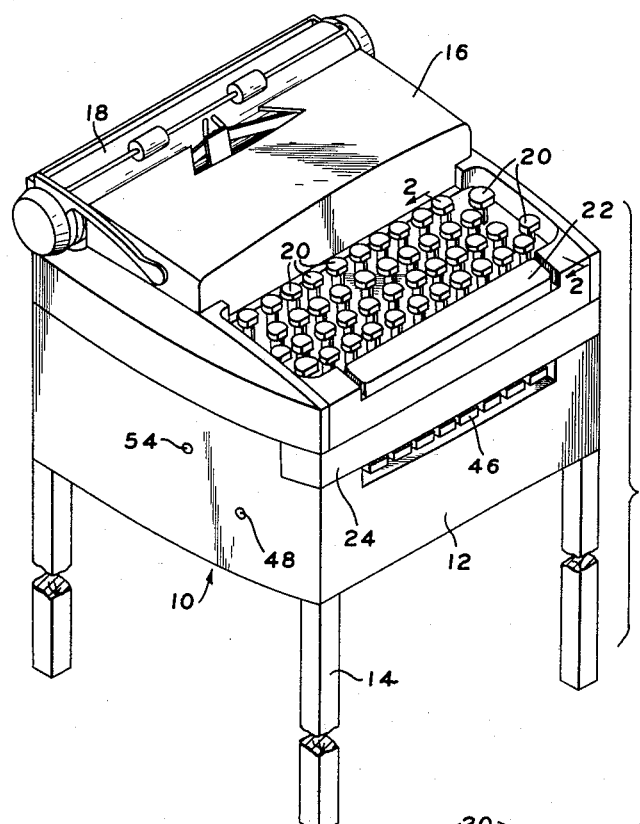
FIGURE 1 is a perspective view of the musical typewriter of the present invention.

The musical typewriter 10 includes a housing 12 which may be of any configuration in transverse cross section. The housing 12 is illustrated as being supported on legs 14. If desired, the legs 14 may be eliminated. A typewriter 16 is supported on the housing 12 in any convenient manner. The typewriter 16 is a standard typewriter having a carriage 18, keys 20, a spacer bar 22, etc.

Figure 2:
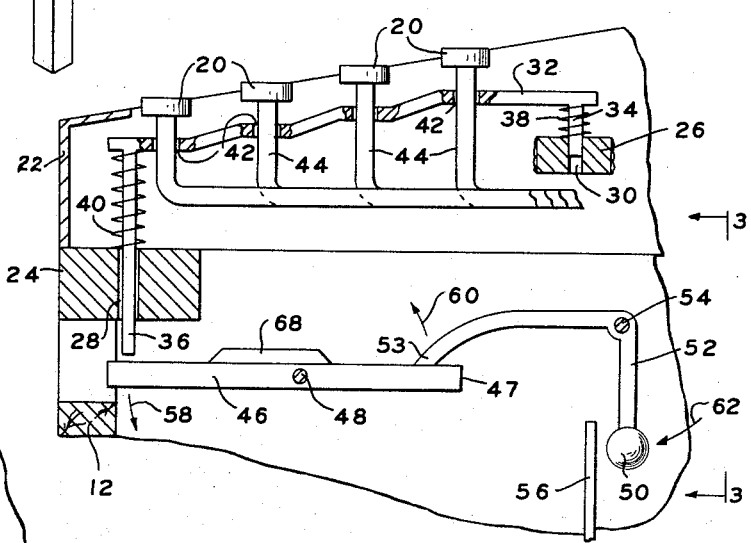
FIGURE 2 is a sectional view taken along the lines 2—2 in FIGURE 1.

A pair of guide rails 24 and 26 extend transversely across the housing beneath the typewriter 16 as shown more clearly in FIGURE 2. The guide rail 24 is provided with a row of spaced holes 28. The guide rail 26 is provided with a row of spaced holes 30. A plurality of actuator members 32 extend between aligned holes 28 and 30. The members 32 are disposed at a slight angle with respect to the spacer bar 22. For example, one actuator member 32 will be in line with the indicia CDE3 on the keyboard of a standard typewriter.

Each member 32 has a guide pin 34 extending into and guided by a hole 30 on the rail 26. Also, each member 32 has a striker pin 36 extending through a hole 28 on the rail 24. It will be noted that the hole 28 is larger in diameter than the pin 36. Springs 38 and 40 surround the pins 34 and 36, respectively, thereby biasing the members 32 to the disposition illustrated in FIGURE 2. A plurality of piano keys 46 are rotatably supported by the rod 48 within the housing 12. As shown more clearly in FIGURE 2, one end of the keys 46 are disposed below and spaced from the striker pins 36. A striker pin 36 will be disposed above each key 46. A key 46 will be provided for each note of the musical scale.

A hammer 50 is secured to one end of a L-shaped link 52. The link 52 is mounted for rotary movement about a rod 54 extending transversely across the housing 12. End 53 of the link 52 is in abutting contact with the key 46 adjacent the end 47. The hammer 50 is adapted to strike a tuned sound generating element 56. The element 56 may be a percussion plate, percussion wire, etc. For each striker pin 36, there is a key 46, hammer 50 and element 56.

The musical typewriter 10 is operated as follows:

A piece of paper will be disposed within the carriage 18 in a conventional manner. When a person strikes one of the keys 20, there is loss motion between the key struck and the member 32. After a sufficient downward movement of the key 20, the key 20 will abut the actuator member 32 thereby causing the striker pin 36 to strike the key 46. When the key 46 is struck, the end of the key 46 juxtaposed to the pin 36 rotates in the direction of arrow 58. End 47 and end 53 will then rotate in the direction of arrow 60. Rotation of the end 53 in the direction of arrow 60 causes the hammer 50 to rotate in the direction of arrow 62 thereby striking the element 56.

There are approximately thirty (30) keys on a standard keyboard. In the typewriter illustrated, any one of the keys of the keyboard which are in a row and have their upright lever portion 44 extending through a hole 42 in the member 32 will actuate the same key 46. The musical scale do, ray, me, fa, sol, la, te, do can be played by actuating the typewriter keys in the following sequence: ASDF JKL;. Timing between notes is obtained by striking the spacer bar 22. The nursery rhyme "Mary Had A Little Lamb" may be played by striking the following keys of the typewriter: DXQWEDC XSW DYJ DSAXCDE DSXCSZ.

A blind person familiar with the musical scale will immediately recognize that he has actuated a wrong typewriter key since the note will be a discordant note. While learning to type, a novice will find the musical typewriter of the present invention enjoyable and entertaining. Exercises will be provided so that when typed they will sound out a scale of a familiar song. If the exercise is typed properly, the song will be heard correctly. Hence, the instructor need not look at the student's paper. A mistake can be detected merely by listening to the melody of the song being played.

Figure 3:
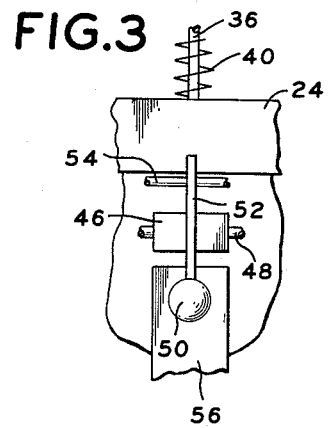
FIGURE 3 is a view taken along the lines 3—3 in FIGURE 2.
Figure 4:
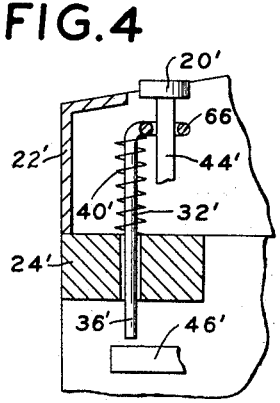
FIGURE 4 is a sectional view, similar to FIGURE 2, but of another embodiment of the present invention.

In FIGURE 4, there is shown another embodiment of the present invention. The embodiment illustrated in FIGURE 4 is substantially identical with the embodiment in FIGURES 1-3. Accordingly, like elements are provided with corresponding primed numerals. The embodiment in FIGURE 4 differs from the embodiment in FIGURES 1-3 by utilizing a discrete actuator member 32' for each key 20' on the keyboard of the typewriter. The actuator member 32' is preferably made from a strip of stiff wire-like material terminating in a closed loop 66. The upright portion of the lever actuator on the key 20' extends through the loop 66. Loss motion will be provided between the key 20' and the loop 66 in the same manner as described above. Such loss motion is necessary if the key 20 or 20' is to travel a sufficient distance so that indicia will be imprinted upon paper in the carriage.

Since the embodiment in FIGURE 4 is otherwise identical with the embodiment in FIGURES 1-3, it need not be described in detail. The embodiment of FIGURE 4 enables a larger number of tuned sound generating elements to be utilized. That is, each of the keys of the typewriter keyboard could be associated with a key 46 or key 68 for playing half tones.

The present invention may be embodied in other specific forms without departing from the spirit or essential attributes thereof and, accordingly, reference should be made to the appended claims, rather than to the foregoing specification as indicating the scope of the invention.

We claim:

1. Apparatus comprising a musical typewriter having a keyboard and paper accommodating means, said keyboard having a plurality of keys arranged for ten finger typing, said keys being formed into eight distinct groups corresponding to the four typing fingers on each hand of the operator of the apparatus, eight tuned sound generating elements arranged in a sequence according to a diatonic musical scale, a hammer for each sound generating element, each of said groups of keys being operatively associated with a separate hammer whereby a single musical note is generated by the striking of a key within its associated finger group by the correct finger of the user.

2. The apparatus of claim 1 including a spacer bar separate from the tuned sound generating elements, and striking elements associated with each key on said keyboard whereby the indicia of each typewriter key is printed on paper in said paper accommodating means when the individual key is struck.

References Cited in the file of this patent

UNITED STATES PATENTS

| | | |
|---|---|---|
| 700,906 | Edwards | May 27, 1902 |
| 704,112 | Robinson | July 8, 1902 |
| 2,159,491 | Rose | May 23, 1939 |